(12) United States Patent
Hageman et al.

(10) Patent No.: US 6,298,961 B1
(45) Date of Patent: Oct. 9, 2001

(54) RESERVOIR CAP AND BLEED MECHANISM

(75) Inventors: John B. Hageman, Vandalia; Paul Rymoff, Jr., Bellbrook, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/792,727

(22) Filed: Feb. 23, 2001

Related U.S. Application Data

(60) Provisional application No. 60/186,368, filed on Mar. 2, 2000.

(51) Int. Cl.[7] .............................. B60T 11/00; B60T 11/20
(52) U.S. Cl. ........................... 188/352; 220/721; 60/562; 60/585
(58) Field of Search ..................................... 188/352, 358; 60/562, 585; 220/203.09, 203.18, 721, 723

(56) References Cited

U.S. PATENT DOCUMENTS

| | | | |
|---|---|---|---|
| 3,977,105 | * 8/1976 | Tsubouchi | 40/628 |
| 4,135,635 | * 1/1979 | Fujii et al. | 220/721 |
| 5,072,844 | * 12/1991 | Nakano et al. | 215/230 |
| 5,136,847 | * 8/1992 | Zander et al. | 60/585 |
| 5,243,823 | * 9/1993 | Jordan et al. | 60/562 |
| 5,347,813 | * 9/1994 | Yanagi et al. | 60/585 |
| 5,431,204 | * 7/1995 | Neward | 141/319 |

* cited by examiner

Primary Examiner—Christopher P. Schwartz
(74) Attorney, Agent, or Firm—Scott A. McBain

(57) ABSTRACT

The present invention provides a reservoir cap and bleed mechanism for use with the fluid reservoir of a dry interface corner actuator. The reservoir cap and bleed mechanism displaces a portion of the reservoir volume during filling and provides a diaphragm to maintain a fill reservoir volume during operation. The fluid reservoir can be bled and filled to the desired brake fluid level through a sealable passage in the reservoir cap assembly without removing the reservoir cap.

18 Claims, 5 Drawing Sheets

RESERVOIR CAP AND BLEED MECHANISM

CROSS REFERENCE TO RELATED APPLICATION

This application claims priority from U.S. Provisional Application No. 60/186,368, filed Mar. 2, 2000.

TECHNICAL FIELD

The technical field of this disclosure is brake fluid reservoirs. In particular, a brake fluid reservoir is provided with a reservoir cap for maintaining a full reservoir volume and allowing service bleeding.

BACKGROUND OF THE INVENTION

Hydraulic braking systems have typically been the basis for vehicle braking systems, especially automotive braking systems. Hydraulic systems are used to convert fluid pressure into linear and/or mechanical motion. Such systems allow the source of the hydraulic pressure to be positioned remotely from the cylinders that effect the braking action. These systems comprise an actuator, such as a brake pedal, reservoir fluid responsive to pressure applied by the actuator, (such as a master cylinder) and means for converting the hydraulic pressure to a braking force, generally fluid cylinders. Mechanical braking pressure is achieved by utilizing the force of the depression of the brake pedal by the driver to increase the pressure on the master cylinder. Such systems are typically accompanied by a vacuum boost that multiplies the force supplied to the brake pedal, throughout the braking operation. The increased pressure in the master cylinder is then transmitted through fluid lines to the fluid cylinders. The fluid cylinders operate the calipers thereby forcing the calipers and brake pads against rotors or drums which slows the vehicle by frictional force.

Hydraulic systems of the above-described type have many disadvantages. These include the large amount of volume and mass that the master cylinder, vacuum booster, ABS modulator and hydraulic lines add to the completed vehicle. Installation of standard hydraulic braking systems is also complicated and labor intensive. Additionally, the large number of parts and installation also adds to repair and maintenance issues as individual parts reach the end of their useful life. A variant form of applying a vehicle brake system is referred to as a brake by wire brake system (BBW). BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

A particular type of BBW systems is known as a "dry interface corner" system (DIC). The typical DIC system operates when a driver inputs a force to the brake pedal. A force sensor and travel sensor attached to the pedal transmits an electronic signal to an electronic controller, which in turn sends the signal to the self contained braking device typically located at each wheel of the vehicle. The DIC system is known as a hybrid system in that electric signals are used to generate the type and amount of braking force required at each wheel of the vehicle with electrical wires rather than standard hydraulic brake lines. Located at each corner of the vehicle is a self-contained module that takes the electrical signal and mechanically brakes the vehicle. The self-contained module utilizes an individual motor that drives a ball screw piston assembly that pressurizes hydraulic brake fluid to ultimately apply the brake caliper to a rotor at that corner of the vehicle. Such a DIC system significantly reduces assembly cost. The individual modules can be separately assembled and fluid filled prior to the manufacture of the vehicle. DIC modules then only need to be bolted to the automobile during the assembly process and plugged in using standard electrical connections. Thus, reliability and quality control of the overall brake system is also increased. Finally, the elimination of hydraulic lines stretching throughout the vehicle as well as the elimination of the master cylinder, booster, and ABS modulator reduces space requirements within the engine compartment.

Presently, fluid reservoirs are filled at the assembly plant through a reservoir cap using an evacuate-and-fill or bleeder ball technique. Because the cap is open, fluid may spill and create a mess. The final fill level may vary. Contamination may enter the fluid system through the open cap, blocking small passages and wearing finished surfaces.

Once the vehicle is on the road, field service may need to be performed on the braking module to assure reliable operation. Opening the reservoir cap can introduce contamination into the system, particularly since the DIC braking module is mounted near the ground where it can accumulate dirt and debris. Because of the location of the DIC braking module on the vehicle, it may be difficult to see the fluid level and to achieve the correct fluid level.

It would be desirable to have a dry interface corner assembly reservoir cap that would overcome the above disadvantages.

SUMMARY OF THE INVENTION

One aspect of the present invention provides a reservoir cap and bleed mechanism for a dry interface corner reservoir assembly that can be filled without removing the reservoir cap, reducing spillage and contamination.

Another aspect of the invention provides a reservoir cap and bleed mechanism for a dry interface corner reservoir assembly that can be supplied to the vehicle manufacturer completely evacuated and filled to the proper level.

Another aspect of the invention provides a reservoir cap and bleed mechanism for a dry interface corner reservoir assembly that can be filled to the proper level and service bled in the field without opening the reservoir cap and observing the fluid level.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
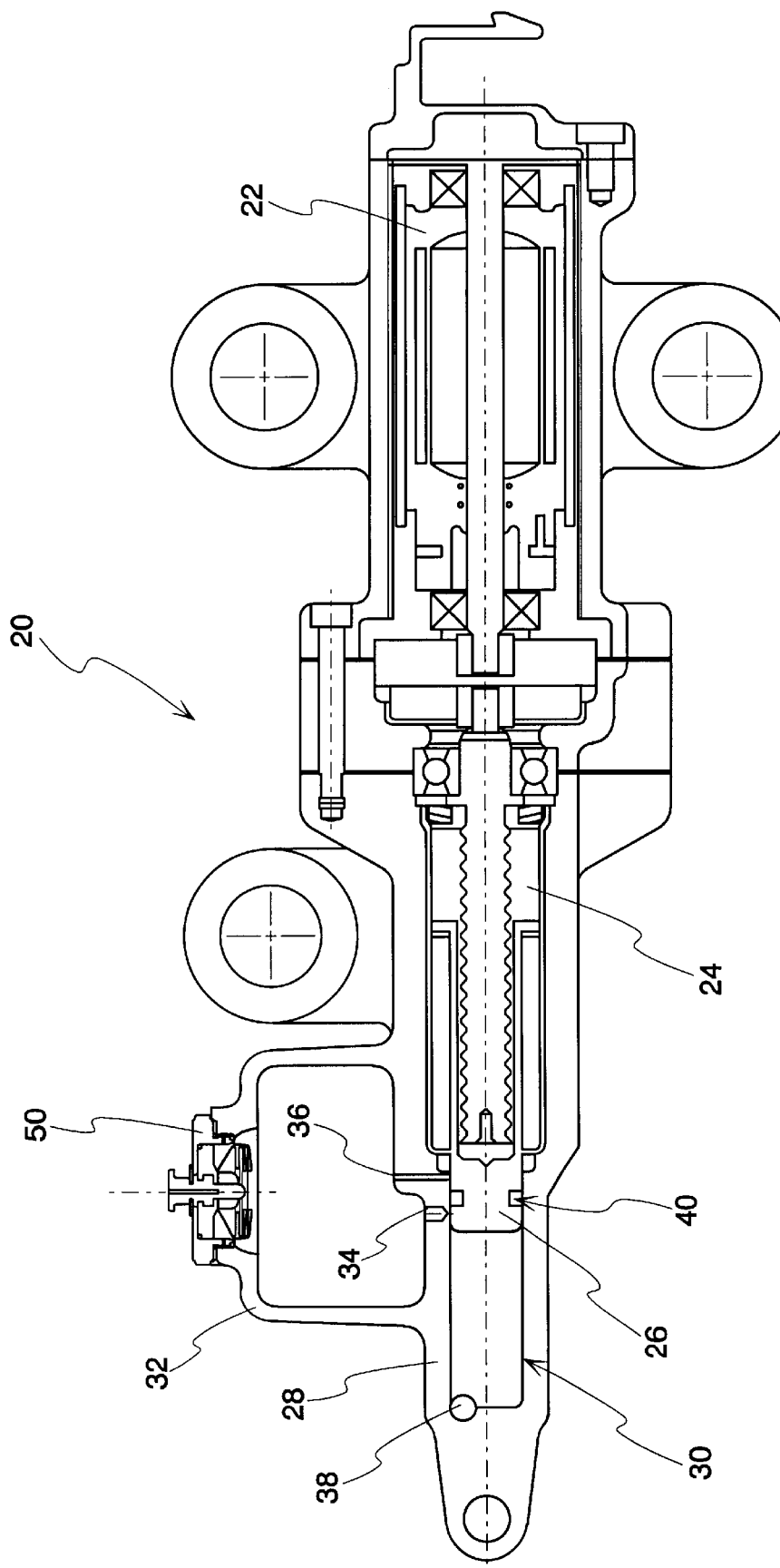
FIG. 1 shows an embodiment of the independent hydraulic actuator assembly for a wheel brake assembly providing a reservoir cap and bleed mechanism made in accordance with the present invention.

The Dry Interface Corner (DIC) brake system shown in FIG. 1 can provide an independent hydraulic actuator assembly 20 for each wheel brake assembly. The actuator assembly 20 can include a motor 22 that drives a gear mechanism and a ballscrew assembly 24 that applies and releases a hydraulic piston 26 in an actuator body 28. The actuator body 28 can include a bore 30 that communicates with a brake fluid reservoir 32 through a bypass hole 34 and a compensating hole 36. The actuator assembly 20 can be in hydraulic communication with the wheel brake (not shown) through the bore outlet 38. In the embodiment of FIG. 1, when the actuator assembly 20 is at the brake-released position, the brake fluid path between the wheel brake and the fluid reservoir 32 is open. This allows brake fluid to flow to and from the fluid reservoir 32. Cap assembly 50 contains the fluid in the fluid reservoir 32, and allows for brake fluid expansion and contraction because of temperature change and allows for brake fluid compensation of brake lining-wear.

During a brake apply, first seal 40 on piston 26 closes off the bypass hole 34 allowing pressure to be built up in bore 30 which translates to brake force at the wheel brake assembly. The fluid volume in the fluid reservoir 32 is sufficient to compensate for full brake lining wear at that particular wheel brake.

Figure 2:
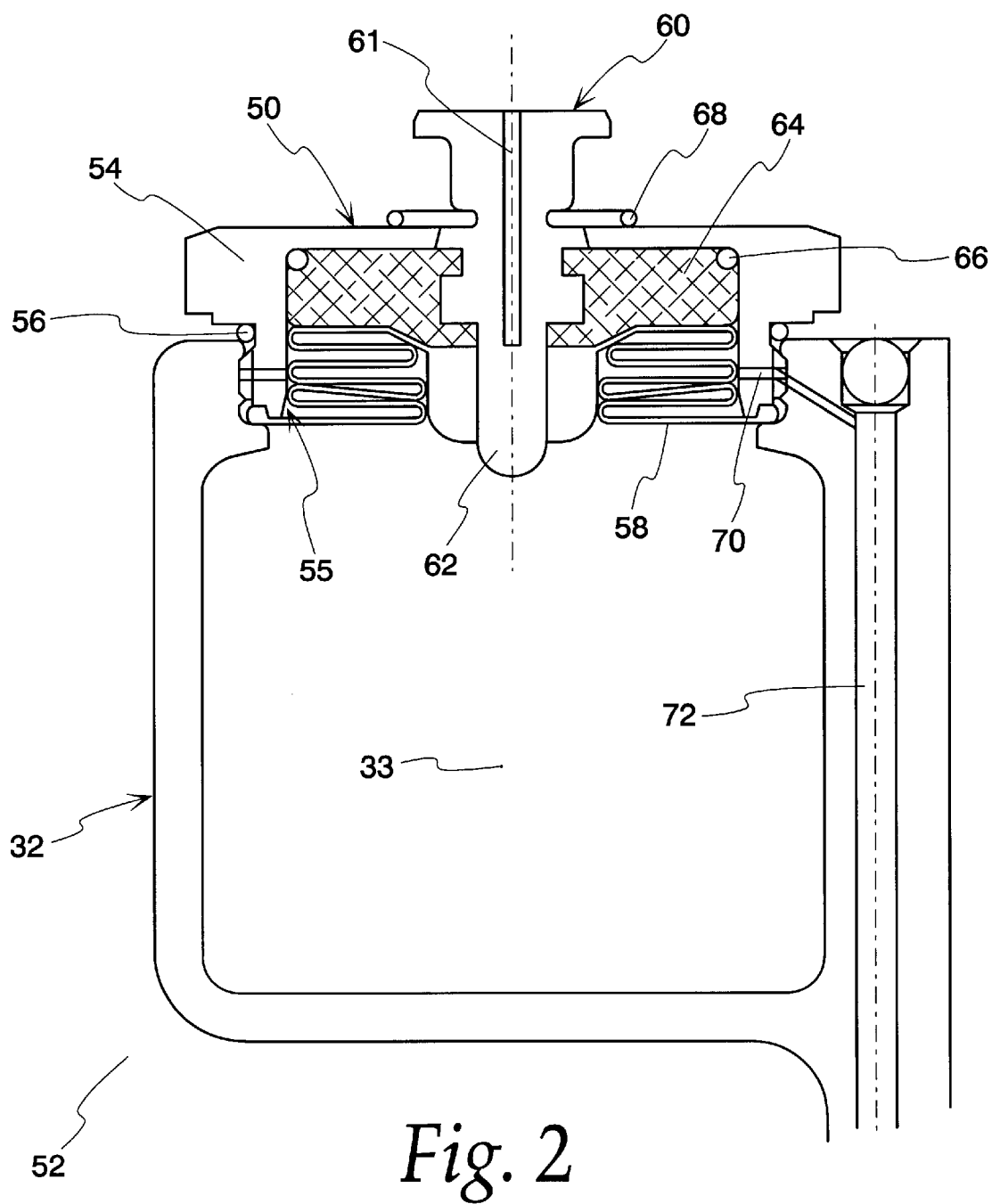
FIG. 2 shows an embodiment of a reservoir cap and bleed mechanism made in accordance with the present invention.

Referring to FIG. 2, an embodiment of a reservoir assembly in general is shown at 52. The brake fluid is contained in the fluid reservoir 32, which forms reservoir volume 33 and is sealed from the outside environment by the cap assembly 50. The cap assembly 50 for this design can consist of several components. There is an external cap 54 and a second seal 56 that attaches to the fluid reservoir 32 and seals this interface. There is a convoluted diaphragm. 58 that isolates the brake fluid and unfolds to compensate for reduced fluid volume in the fluid reservoir 32 as brake fluid is used to compensate for brake lining wear. The external cap 54 has a valve port 55 formed within to accept the convoluted diaphragm 58 and valve 60.

The valve 60 is slidably disposed within the valve port 55 and comprises a valve stem 62 and the inner cap 64. The valve stem 62 can be molded into the inner cap 64. The valve stem 62 has a sealable passage 61 that permits filling and bleeding the brake fluid to the reservoir volume 33. The inside diameter of the diaphragm 58 seals around the outside diameter of the valve stem 62. The inner cap 64 is sealed against the external cap 54 by means of third seal 66. The valve 60 is held in the release position by the retaining clip 68 in a preferred embodiment. Other means of keeping the valve 60 in the release position, such as threads, bayonet locks, twist locks, are well known to those skilled in the art. There is an air vent passage 70 in the external cap 54 that connects to an air vent channel 72 in the actuator body 28. The vent channel 72 vents to atmosphere in a method not shown. The vent channel 72 exposes the area between the inner cap 64 and the diaphragm 58 to atmospheric pressure. This allows the diaphragm 58 convolutes to unfold as fluid is used from the fluid reservoir 32 resulting in atmospheric pressure balance on both sides of the diaphragm 58.

Figure 3:
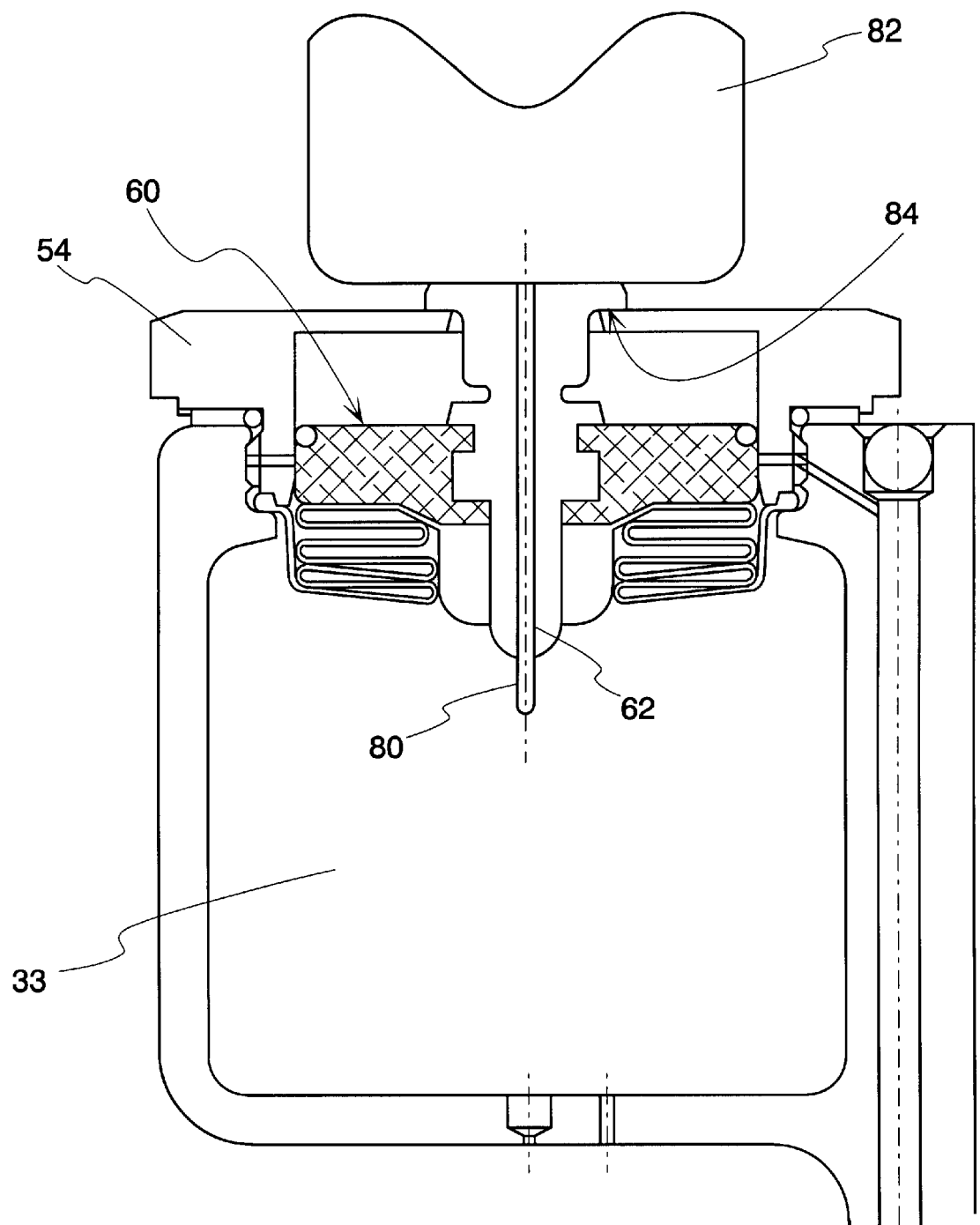
FIG. 3 shows filling of an embodiment of a reservoir cap and bleed mechanism made in accordance with the present invention.

The mechanism of the brake fluid factory evacuate and fill method is shown in FIG. 3, where elements shared with those shown in FIG. 2 share like reference characters. The assembly in FIG. 3 shows the retaining clip (not shown) removed while the valve 60 is in a fill position where surface 84 of the valve stem 62 rests against the top surface of the external cap 54. The evacuate and fill head 82 includes a hollow tube 80 that is inserted through the center of valve stem 62 and the base of the evacuate and fill head 82 rests on the top surface of valve stem 62. The distance that the valve stem 62 and inner cap 64 are moved to the fill position is selected to be a fixed percentage of the total reservoir volume 33 as shown in FIG. 2. This will represent about 5 to 10 percent of the total reservoir volume 33. Not shown in FIG. 3 is that the actuator assembly 20 is hydraulically attached to a wheel brake assembly by means of either a brake pipe or brake hose. With the unit in the illustrated position and piston 26 as shown in FIG. 1 is in the released position, a typical air evacuation and brake fluid fill procedure is performed on the assembly. At the conclusion of the evacuate and fill procedure, the evacuate and fill head 82 is extracted from the valve stem 62.

Figure 4:
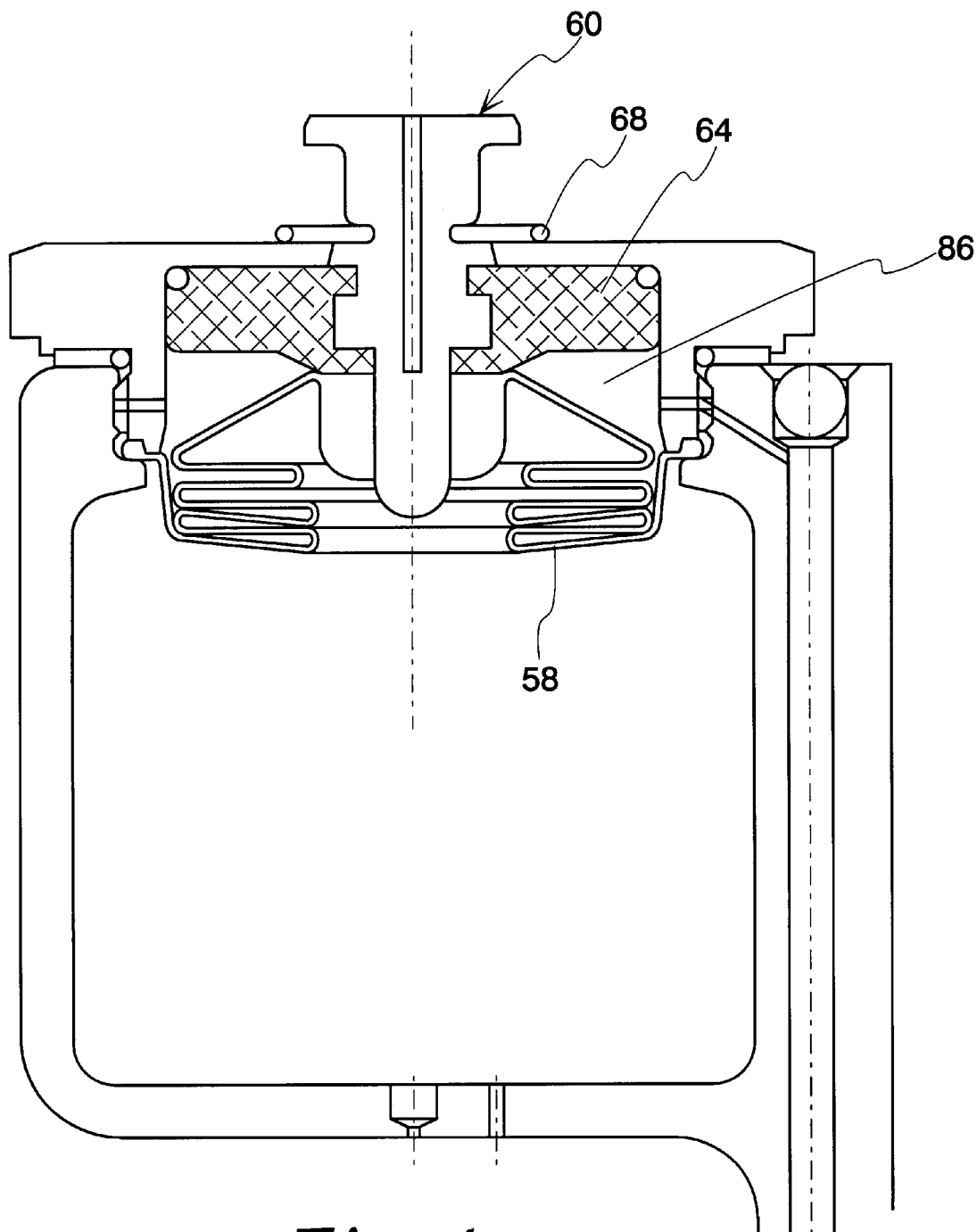
FIG. 4 shows a filled state of an embodiment of a reservoir cap and bleed mechanism made in accordance with the present invention.

FIG. 4 illustrates position of the cap assembly 50 after the evacuate and fill procedure. Valve 60 is now in the release position and held in place by retaining clip 68. The resultant air volume 86 that is located between the bottom of the inner cap 64 and the diaphragm 58 is sufficient to ensure no pressure buildup in the reservoir due to brake fluid thermal expansion.

Figure 5:
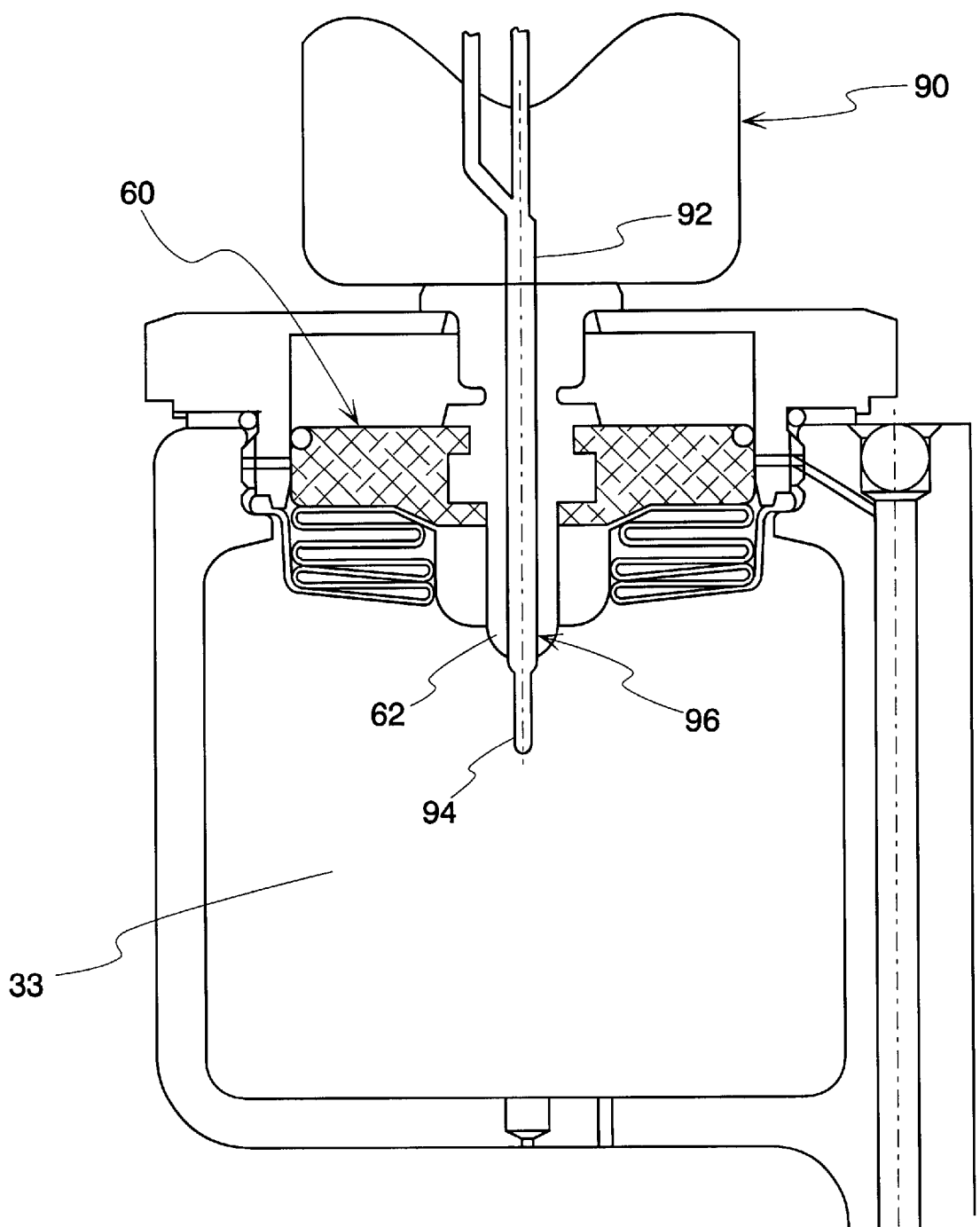
FIG. 5 shows service bleeding of an embodiment of a reservoir cap and bleed mechanism made in accordance with the present invention.

FIG. 5 illustrates a method for service bleeding this design. One method is for the removal of retaining clip 68 and positioning of valve stem 62 and inner cap 64 in the fill position. The brake fluid fill cap 90 will have a dual channel hollow tube 92 for insertion into the valve stem 62. The preferred embodiment discloses an annular dual channel hollow tube 92, but other configurations such as side-by-side dual channels or separate tubes are alternatives. The inner channel 94 will connect directly to the pressurized brake fluid in the bleeder ball. The outer channel 96 will connect to a vent tube (not shown) with a normally closed shutoff valve. The overall length of the outer channel 96 is just long enough to protrude to the end of valve stem 62. After insertion of the dual channel hollow tube 92 into the valve stem 62, the reservoir volume 33 is exposed to bleeder ball pressure and the brake corner assembly is pressure bled in a conventional manner. After the system is pressure bled the shut off valve to the outer channel 96 is opened and any remaining air is purged from the reservoir. With the shut off valve open, pressure is closed off from inner channel 94 and the pressure is reduced to atmospheric. At this time, the brake fluid fill cap is removed and the valve 60 is returned to the top position and held in place by retaining clip (not shown). Again, everything is as described previously for FIG. 4.

This description is for one embodiment of a reservoir cap and bleed mechanism for a dry interface corner reservoir assembly. The reservoir cap and diaphragm are designed such that the brake corner assembly can be bled and filled to the desired brake fluid level without removing the reservoir cap. This is an advantage both in initial assembly evacuate and fill procedures and in service pressure bleed of the design. At the initial build, this eliminates spills and potential contamination in the reservoir. The invention also allows service bleeding without removing the reservoir cap that minimizes the potential of dirt and debris in the reservoir. The cap design and the service bleed adapter are designed such that the reservoir can be filled to the desired level without visually seeing the fluid level. Although the reservoir cap and bleed mechanism are particularly suited for use with a dry interface corner reservoir assembly, the invention can be used to advantage on any fluid system that must be kept fill and air free, and requires service bleeding.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A reservoir cap and bleed mechanism for a reservoir having a reservoir volume for containing fluid comprising:
    a reservoir cap assembly having a valve port, the reservoir cap assembly mountable on the reservoir;
    a valve slidably disposed in the valve port, the valve having a sealable passage connectable from the reservoir volume to the exterior of the reservoir, the valve having a release position and a fill position; and
    a diaphragm sealing the reservoir volume from the valve port and responsive to the position of valve, the diaphragm displacing a portion of the reservoir volume when the valve is in the fill position.

2. The reservoir cap and bleed mechanism of claim 1 wherein the diaphragm displaces a sufficient portion of the reservoir volume when the valve is in the fill position to account for thermal expansion of the fluid and brake wear.

3. The reservoir cap and bleed mechanism of claim 2 wherein the diaphragm displaces 5 to 10 percent of the reservoir volume.

4. The reservoir cap and bleed mechanism of claim 1 wherein the valve comprises an inner cap connected to a valve stem, the valve stem housing the sealable passage.

5. The reservoir cap and bleed mechanism of claim 1 wherein the diaphragm is a convoluted diaphragm.

6. The reservoir cap and bleed mechanism of claim 1 wherein the reservoir cap and bleed mechanism further comprises means for retaining the valve in the release position.

7. The reservoir cap and bleed mechanism of claim 1 wherein the retaining means is a retaining clip.

8. A method for filling a reservoir having a reservoir volume for containing fluid comprising the steps of:
    providing a reservoir cap assembly on the reservoir, the reservoir cap assembly having a valve, the valve having a release position and a fill position and a sealable passage, the sealable passage connectable from the reservoir volume to the exterior of the reservoir;
    placing the valve in the fill position, displacing a portion of the reservoir volume;
    inserting a hollow tube into the reservoir volume through the sealable passage;
    removing any air from the reservoir volume through the hollow tube;
    filling the reservoir volume with fluid through the hollow tube;
    withdrawing the hollow tube from the sealable passage; and
    placing the valve in the release position.

9. The method of claim 8 wherein the step of placing the valve in the fill position, displacing a portion of the reservoir volume, displaces a sufficient portion of the reservoir volume to account for thermal expansion of the fluid.

10. The method of claim 9 wherein the step of placing the valve in the fill position, displacing a portion of the reservoir volume, displaces 5 to 10 percent of the reservoir volume.

11. A method for service bleeding a reservoir having a reservoir volume for containing fluid comprising the steps of:
    providing a reservoir cap assembly on the reservoir, the reservoir cap assembly having a valve, the valve having a release position and a fill position and a sealable passage, the sealable passage connectable from the reservoir volume to the exterior of the reservoir;
    providing a dual channel hollow tube having a first channel and a second channel;
    placing the valve in the fill position, displacing a portion of the reservoir volume;
    inserting the dual channel hollow tube into the reservoir volume through the sealable passage;
    pressurizing the reservoir volume through the first channel;
    bleeding air from the reservoir volume to the atmosphere through the second channel;
    removing pressure from the first channel;
    withdrawing the hollow tube from the sealable passage; and
    placing the valve in the release position.

12. The method of claim 11 wherein the step of placing the valve in the fill position, displacing a portion of the reservoir volume, displaces a sufficient portion of the reservoir volume to account for thermal expansion of the fluid.

13. The method of claim 12 wherein the step of placing the valve in the fill position, displacing a portion of the reservoir volume, displaces 5 to 10 percent of the reservoir volume.

14. The method of claim 11 wherein the second channel of the dual channel hollow tube is just long enough to open into the reservoir volume from the sealable passage.

15. The method of claim 11 wherein the dual channel hollow tube is annular with the first channel as inner channel and the second channel as outer channel.

16. The method of claim 15 wherein the outer channel of the dual channel hollow tube is just long enough to open into the reservoir volume from the sealable passage.

17. A reservoir cap and bleed mechanism for a reservoir having a reservoir volume for containing fluid comprising:
    a reservoir cap assembly having a valve port the reservoir cap assembly mountable on the reservoir;
    a valve comprising a valve stem and an inner cap, the valve having a release position and a fill position, the inner cap sized to displace 5 to 10 percent of the reservoir volume, and the valve stem having a sealable passage connectable from the reservoir volume to the exterior of the reservoir; and
    a diaphragm sealing the reservoir volume from the valve and responsive to the position of valve, the diaphragm being a convoluted diaphragm;
    wherein the valve is slidably disposed within the valve port and the inner cap urges the diaphragm to displace fluid in the reservoir volume when the valve is in the fill position.

18. The reservoir cap and bleed mechanism of claim 17 wherein the valve stem is adapted to receive a retaining clip, the retaining clip able to maintain the valve is in the release position.

* * * * *